UNITED STATES PATENT OFFICE.

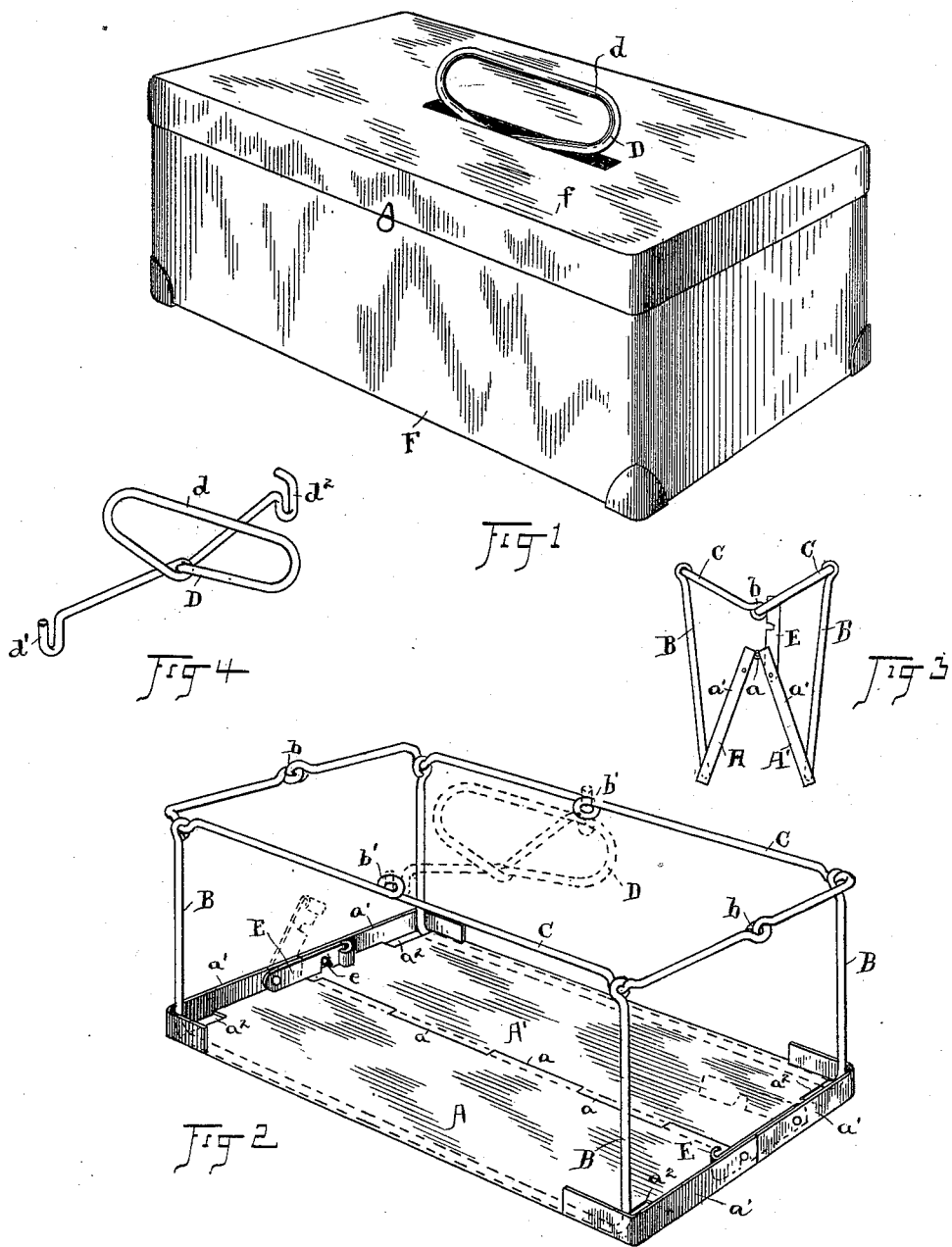

JOHN N. HAHN AND JACOB P. HERMAN, OF CLEVELAND, OHIO.

LUNCH-BASKET.

SPECIFICATION forming part of Letters Patent No. 478,103, dated July 5, 1892.

Application filed September 24, 1891. Serial No. 406,633. (No model.)

*To all whom it may concern:*

Be it known that we, JOHN N. HAHN and JACOB P. HERMAN, citizens of the United States, residing at Cleveland, in the county of Cuyahoga and State of Ohio, have invented certain new and useful Improvements in Lunch-Baskets; and we do hereby declare that the following is a full, clear, and exact description of the invention, which will enable others skilled in the art to which it appertains to make and use the same.

Our invention relates to lunch-baskets; and the object of the invention is to provide a lunch-basket which is capable of being folded and brought into such a small compass that it can readily be carried in a side coat-pocket or a hip-pocket without inconvenience.

To this end the invention consists, first, in a skeleton frame provided with hinges and joints in such places and relations that the basket may be folded on its longitudinal center.

The invention consists, secondly, in a skeleton-jointed frame provided with a removable handle-piece; and the invention further consists in a skeleton frame of the kind, substantially as shown and described, provided with a removable flexible cover, all substantially as shown and described, and particularly pointed out in the claims.

In the accompanying drawings, Figure 1 is a perspective view of a basket constructed after the manner herein described and having the cover thereon as it appears in use. Fig. 2 is a perspective view of the skeleton frame itself with the parts extended, as in Fig 1, and as the basket is arranged for use. Fig. 3 is an end elevation of the skeleton frame somewhat reduced in size and shown as partly folded. Fig. 4 is a detail of the handle-piece separated from the basket.

In the construction of this basket we employ a sheet-metal bottom formed of sections A A' of equal size and covering the entire bottom of the basket. These sections are preferably made of sheet-tin, but may be made of any other suitable metal or material, and are hinged along their meeting edges $a$ practically their entire length, so as to unite the two sections completely and evenly at their place of meeting, and that they may sustain any weight that may be placed in the basket without pressing down one portion of the bottom beneath the other. At the corners of these sections and extending into the pivot-line $a$ are flanges $a'$ of suitable elevation—say an inch or thereabout—at right angles to the bottom and preferably cut from the same sheet of metal, as the bottom. These flanges $a'$ may of course be soldered on the bottom, if desired, but the better way is to form them in same piece with the bottom, and they extend not only entirely across the respective ends of the basket with their extremities on each section resting against each other, as shown, but also extend a short distance along the sides around the corners of the basket from the ends, so as to form a stop for the upright posts or corner-pieces B.

The entire skeleton frame, excepting the bottom, is made of wire of suitable size, so that the frame-work will be strong and firm enough for all practical purposes, and yet keep the basket as light as possible.

The corner-pieces B are formed on each side of two pieces of wire laid along the bottom of the basket and having their ends bent up to form said corners, and notches $a^2$ are cut in the bottom to afford room for the said pieces to fold inward after the manner shown in Fig. 3. The top portion of the frame consists, as shown, of two rods C, bent to correspond to the outlines of the basket, whatever they may be, and hooked or looped together on the longitudinal center of the basket, as indicated by $b$. At the point where the said rods are bent at right angles they pass through eyes formed in the uprights B and are so connected at that point that they may turn in the said uprights, but cannot slide back and forth therein. These rods or bars C, which form the sides and the ends of the top frame, as shown, have each at the top center of the basket a loop $b'$, formed therein and adapted to be engaged by the handle-piece D. This handle-piece is made of a single piece of suitable wire with a loop $d$, bent or tied in its center, suitable to form a handle for carrying the basket and having hooks $d'$ $d^2$ at its ends to engage the loops $b'$. The hook $d^2$ is designed to be first inserted and has its extremity bent at right angles to its hook portion, so that it cannot be disengaged by pressing downward thereon, and the other end $d'$ has a plain hook adapted to engage the opposite loop $b'$. Between the ends $d'$ $d^2$ the center of the cross-rod D is bent downward somewhat, so as to give spring to the said piece when in position, with a tendency to keep the sides of the basket apart and to lock the said piece in its loops. This piece D serves as a spreader as well as a handle-piece, and the basket cannot be folded as long as it is in position. Hence to fold the basket the handle-piece must first be removed, which is easily done by detaching its end $d'$ first, and then turning it to detach the end $d^2$.

At the bottom at each end of the basket are locks or latches E, pivoted at one end on the end flange $a'$ and having a notch adapted to engage the projection $e$ on the flange $a'$ on the opposite section of the bottom. When in use, these locks extend across the pivot or hinged line of the bottom sections and firmly lock them together, so that the basket cannot be folded without releasing them from engagement and raising them into the position substantially as shown in dotted lines. It is therefore necessary, when the basket is to be folded, that the said side locks E be raised from engagement with the catches $e$ and that the handle-piece D be removed when folding on the line and in the manner hereinbefore described is duly effected. On the other hand, when the basket is opened for use, the locks E are pressed down into locking position, and the handle-piece is inserted, and then it is ready for use the same as a basket that is permanently open.

F represents the cover of the basket, which may be made of any textile or other suitable material, as rubber cloth, oil-cloth, or the like, which is cut and made to size, according to the size and shape of the frame-work, and adapted to fit snugly upon the same. The cover $f$ is of the nature of a flap, with a slit or opening in its top center, adapted to come down over the handle $d$. When the basket is to be folded, the cover is thrown back off of the handle $d$, so as to enable the handle to be removed, and then after releasing the locks E the basket can be folded, with the cover on, with ease and convenience. When the bottom folds, the central hinge part rises, and hence the two sections are locked firmly together by the latch E engaging over the projection $e$, which ties the parts together above the hinge-point.

The cover F is temporarily fastened along its top edge to the top frame C; but it may be removable each time the frame is folded.

Having thus described our invention, what we claim as new, and desire to secure by Letters Patent, is—

1. A lunch-basket having a flat hinged bottom and a skeleton-jointed frame, said frame having corner-posts pivoted in the bottom and rods pivoted in the tops of the posts and at their ends on the longitudinal center of the basket, substantially as described.

2. In a lunch-basket, a sectional bottom hinged at its longitudinal center, corner-posts pivoted on the said bottom, and two top pieces forming the top of the frame pivoted on said posts and to each other midway across the end of the basket, and a spreader to keep the sides of the basket apart, substantially as described.

3. The basket-frame herein described, consisting of a bottom having plates hinged together, pivoted corner-posts, and top rods pivoted in said posts and at their ends in line with the hinges of the bottom of the basket, in combination with a spreader for the top of the basket and locks at the bottom across the hinge thereof, substantially as described.

4. The sectional bottom having right-angled flanges at its corners, in combination with corner-posts pivoted on said bottom and bearing against said flanges, a top sectional frame supported on said posts, and a spreader for said frame, substantially as described.

5. The bottom sections hinged together and locks across the meeting line of said sections, in combination with the corner-posts pivoted in said bottom sections, the sectional top frame pivoted in said posts, and the handle-piece secured in loops to said top frame, substantially as described.

6. A basket-frame consisting of a hinged bottom and corner-posts and side and end rods supported on said posts, all of said parts jointed together, and a cross-rod provided with a handle bracing the top of said frame, in combination with a flexible cover stretched upon said frame and having an opening for the handle, substantially as described.

Witness our hands to the foregoing specification.

JOHN N. HAHN.
JACOB P. HERMAN.

Witnesses:
H. T. FISHER,
NELLIE L. McLANE.